United States Patent [19]

McMurtry

[11] Patent Number: 4,947,538
[45] Date of Patent: * Aug. 14, 1990

[54] MACHINE TOOL
[75] Inventor: David R. McMurtry, Wotton-Under-Edge, United Kingdom
[73] Assignee: Renishaw plc, Gloucestershire, United Kingdom
[*] Notice: The portion of the term of this patent subsequent to Nov. 17, 2004 has been disclaimed.
[21] Appl. No.: 65,564
[22] Filed: Jun. 23, 1987

Related U.S. Application Data

[63] Continuation of Ser. No. 803,783, Dec. 2, 1985, Pat. No. 4,706,371, which is a continuation of Ser. No. 473,142, Mar. 7, 1983, abandoned.

[30] Foreign Application Priority Data

Mar. 10, 1982 [GB] United Kingdom ................. 8206952

[51] Int. Cl.[5] ............................................. B23Q 3/157
[52] U.S. Cl. ........................................ 29/568; 82/125
[58] Field of Search ............... 29/568, 563, 564, 26 A, 29/27 C, 44, 33 P; 408/35, 69; 82/2.5, 2.7; 414/590, 736

[56] References Cited

U.S. PATENT DOCUMENTS

| | | | |
|---|---|---|---|
| 3,564,943 | 2/1971 | Kavanagh | 29/26 A X |
| 3,766,617 | 10/1973 | Forster et al. | 408/69 |
| 3,821,835 | 7/1974 | St. Andre et al. | 408/35 X |
| 3,918,331 | 11/1975 | Svanstrom | 29/44 X |
| 3,984,905 | 10/1976 | Petzdt | 408/35 |
| 4,019,410 | 4/1977 | Staxzkiewicz | 82/2.5 |
| 4,065,988 | 1/1978 | Lohweis et al. | 82/2.5 X |
| 4,090,287 | 5/1978 | Selander | 29/568 |
| 4,167,362 | 9/1979 | Dietrich | 408/35 |
| 4,302,144 | 11/1981 | Hallquist | 29/568 X |
| 4,355,446 | 10/1982 | Shimaziri et al. | 408/35 X |
| 4,359,815 | 11/1982 | Toyoda | 29/568 |
| 4,404,727 | 9/1983 | Zankl | 29/568 |
| 4,416,577 | 11/1983 | Inaba et al. | 29/568 X |
| 4,499,650 | 2/1985 | Cannon et al. | 29/568 |
| 4,706,371 | 11/1987 | McMurtry | 29/568 |

FOREIGN PATENT DOCUMENTS

| | | |
|---|---|---|
| 1371001 | 10/1974 | United Kingdom . |
| 1371146 | 10/1974 | United Kingdom . |
| 1456385 | 11/1976 | United Kingdom . |
| 2095138 | 9/1982 | United Kingdom . |
| 2120965 | 12/1983 | United Kingdom . |

Primary Examiner—Z. R. Bilinsky
Attorney, Agent, or Firm—Spencer & Frank

[57] ABSTRACT

A machine tool has a table movable relative to a head for machining a workpiece mounted on the head by a tool mounted on the table. The table also supports a magazine for blank workpieces, and the table is movable between a first position in which the head and the tool are in machining promitiy and a second position in which the head and the magazine are proximate. The head has a work holder adapted to grip a blank workpiece at said second position for transfer, by movement of the table, to said first position. After machining, the workpiece is correspondingly returnable to the magazine. The work holder is mounted on a spindle supported on the head and rotatable for machining purposes. In a modification the spindle supports a tool, and the head has a gripper which is separate from the spindle and is used for the transfer of workpieces between the magazine and a work holder mounted on the table.

2 Claims, 2 Drawing Sheets

MACHINE TOOL

This is a continuation of Ser. No. 06/803,783 filed Dec. 2nd, 1985 which is a continuation of Ser. No. 06/473,142 filed Mar. 7th, 1983, abandoned.

BACKGROUND OF THE INVENTION

This invention relates to machine tools, and more specifically to the transferring of workpieces between a location where the workpieces are stored and a location where the workpieces are to be machined. It is known from British Patent No. 1,456,385 (Clarke Chapman Ltd) to provide, in respect of a machine tool such as a lathe, a gripper mounted on the lower end of a column supported on an overhead gantry in turn supported on legs at opposite sides of the machine tool. The column is movable vertically and horizontally to move the gripper between the storage device located to one side of the machine tool and a chuck provided on a horizontal spindle of the machine tool. The gripper is further movable to change the orientation of the workpiece so that a rod-shaped workpiece situated in a vertical position in the storage device can be turned into a horizontal position for insertion into the chuck of the horizontal spindle.

It is generally an object of the invention to simplify the transfer of workpieces between a storage location and a machining location. It is among other objects of the invention to avoid the need for space-consuming devices such as a said overhead gantry and its legs. It is optionally also an object of the invention to avoid the need for turning the workpiece between the storage position and a different position required by the machine tool.

SUMMARY OF THE INVENTION

According to this invention there is provided a machine tool comprising a workpiece support, a tool support, a magazine for workpieces, the magazine being situated in a position remote from one of the supports, means for relatively moving the supports for machining a workpiece supported by the workpiece support by means of a tool supported on the tool support, means for relatively moving the other one of the supports between a first position in which the other support is proximate to the one support for said machining and a second position in which the other support is proximate to the magazine, gripper means provided on the other support, and means for operating the gripper means to grip and release a workpiece at least when the other support is at said second position. The invention makes it possible to use the relative movement between the supports for the transfer of a workpiece between the magazine location and the machining location. In this way, a transfer mechanism such as that described in said British Patent No. 1,456,385 is avoided.

BRIEF DESCRIPTION OF THE DRAWINGS

Preferred embodiments of a machine tool according to this invention will now be described, by way of example, with reference to the accompanying drawings wherein.

DETAILED DESCRIPTION OF PREFERRED EMBODIMENTS

Figure 1:
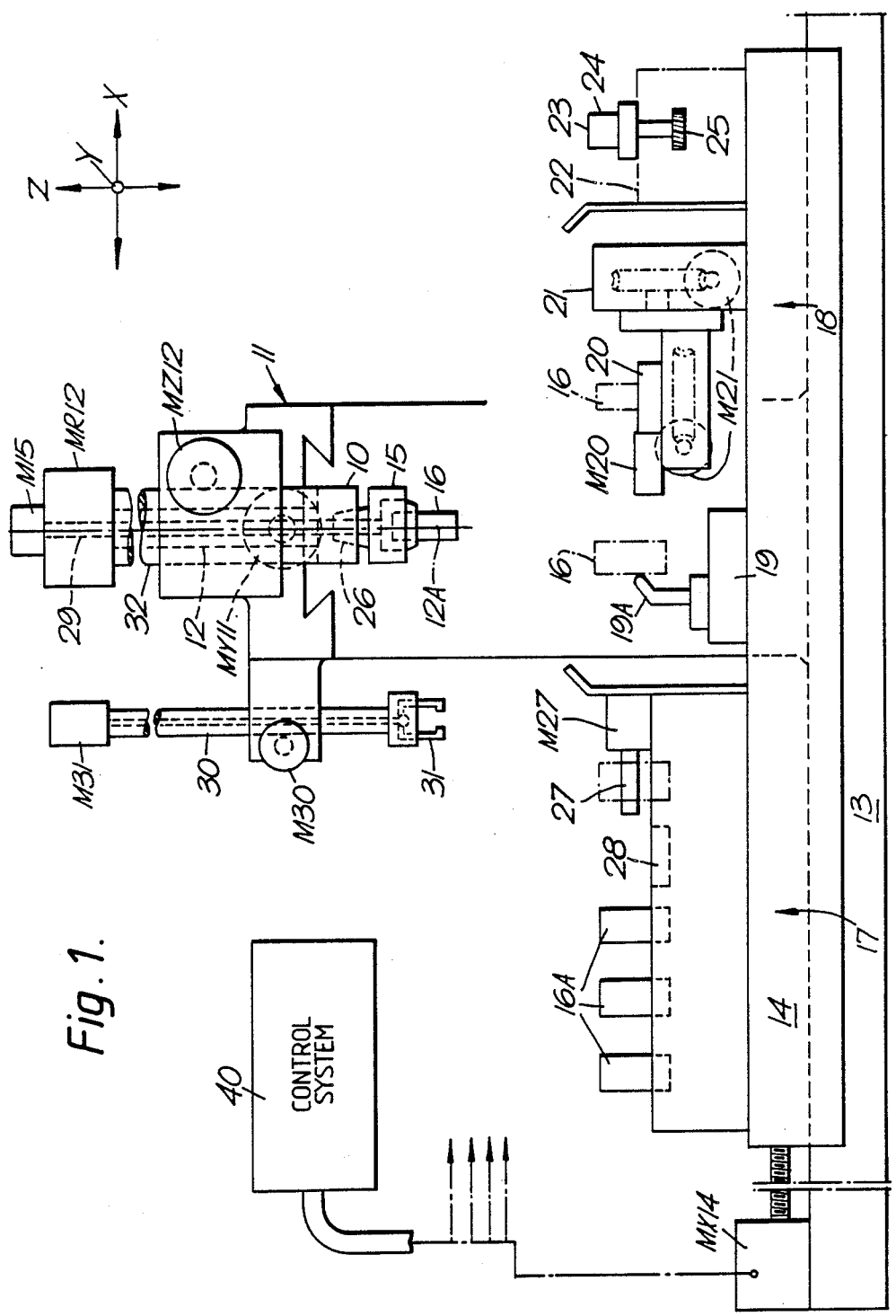
FIG. 1 is a front elevation of a first embodiment of the machine tool.
Figure 2:
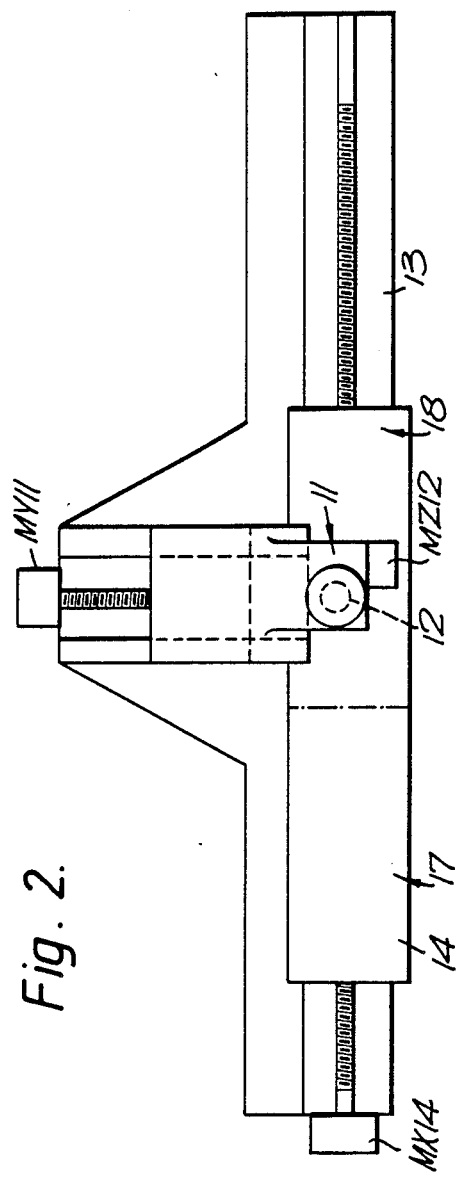
FIG. 2 is a plan view of FIG. 1 drawn diagrammatically and to a reduced scale.

Referring to FIGS. 1 and 2, the machine tool comprises a head 10 supported on a first support member or headstock 11 by a spindle 12. The spindle 12 is supported for rotation in an arbor 32 and is rotatable by a motor MR12 about an axis 12A. The arbor is movable in the direction of the axis 12A, i.e. in the Z-direction, by a motor MZ12. The headstock 11 is secured to a bed 13 and is movable relative thereto in the Y-direction by a motor MY11. A second support member or table 14 is supported on the bed for movement in the X-direction and is movable in that direction by a motor MX14. The head has releasably secured thereto the work holder 15 having a tapered spigot 26 for engagement with the head 10. The work holder is operable by a motor M15, acting through an operating rod 29, to grip or release a workpiece 16. The table 14 comprises two parts being respectively a machining support 18 and a storage support or magazine 17. The magazine 17 supports a plurality of workpiece blanks 16A. The support 18 has secured thereto a tool mount 19 to which is secured at least one turning tool 19A, a dividing head 21 operable by motors M21 and supporting a chuck 20 operable by a motor M20 for gripping and releasing a workpiece. The support 18 also embodies a tool storage magazine 22 releasably supporting at least one milling tool 23. The tool 23 has at one end a milling cutter 25 and at the other end a spigot 24 dimensioned for being gripped by the holder 15. The table 14 also contains a holder 27 for reversing a said workpiece end-to-end and operable by a motor M27. The table 14 constitutes a common structure for the supports 17,18,22. The machine tool is operated by a numerical control system 40 programmed to act on the motors, generally referred to by the letter M, in a predetermined sequence comprising the following operations:

1. Moving the head 10 and the bed 14 relative to one another (motors MY11,MZ12,MX14) to bring the holder 15 into register with one of the blanks 16A in the magazine 17.
2. Gripping the blank 16A (Motors MZ12,M15).
3. Moving the head 10 into proximity with the tool 19A (Motors MY11,MZ12,MX14).
4. Rotating the spindle 12 (Motor MR12) to rotate the blank 16A relative to the tool 19 for a turning operation.
5. Moving the head and the bed relative to one another (Motors MZ12, MX14) to provide for feed and depth of cut in said turning operation.

The system 40 is further programmed, on completion of the above turning operation, to return the workpiece 16 to the magazine 17 and repeat the cycle for the next blank.

The system 25 may be programmed to perform a milling operation by movng the head 10 to insert the workpiece 16 into the chuck 20 operating the chuck motor M20 to grip the workpiece, moving the head 10 to the tool 23, operating the holder 15 to grip the tool 23, moving the head 10 to move the tool 23 to the workpiece 16 held in the chuck 20, and rotating the spindle 12 and moving the head 10 to carry out the milling operation.

Means may be provided for automatically releasing the holder 15 from the head 10 and securing it thereto.

To this end the motor M15 may be adapted to engage the narrow end of the tapered spigot 26 of the holder 15 and draw the spigot into a receiving socket in the head, the motor acting through the intermediary of the rod 29. Apparatus for automatically securing a work holder or a tool holder to a spindle and releasing it therefrom, and further comprising means for automatically operating the work holder to grip and release a workpiece, is shown in patent applications Nos. 06/551,973; and 06/555,881. The tool 23 may be adapted to be released and secured to the head 10 in the same way as in the holder 15, the spigot 23 then being tapered in the same way as the spigot 26. The system may be programmed to move the head 10 to deposit the holder 15 in a storage socket 28 on the work support 17 and pick up the tool 23 for the latter to take the place of the holder 15 in the head 10.

In a modification, also shown in FIG. 1, an arbor 30 is supported on the headstock 11 for movement toward and away from the table 14 by a motor M30. The arbor 30 has at one end a gripper 31 operable by a motor M31 to grip or release a workpiece. In operation, the workpieces are transferred between the magazine 17 and the chuck 20 by means of the gripper 31, the spindle 12 being used for supporting a tool, e.g. the tool 23, either in the holder 15 or by means of a spigot such as 26. The arbor 30 and gripper 31 can be a relative light structure compared to the spindle 12 which has to sustain the machining forces.

Figure 3:
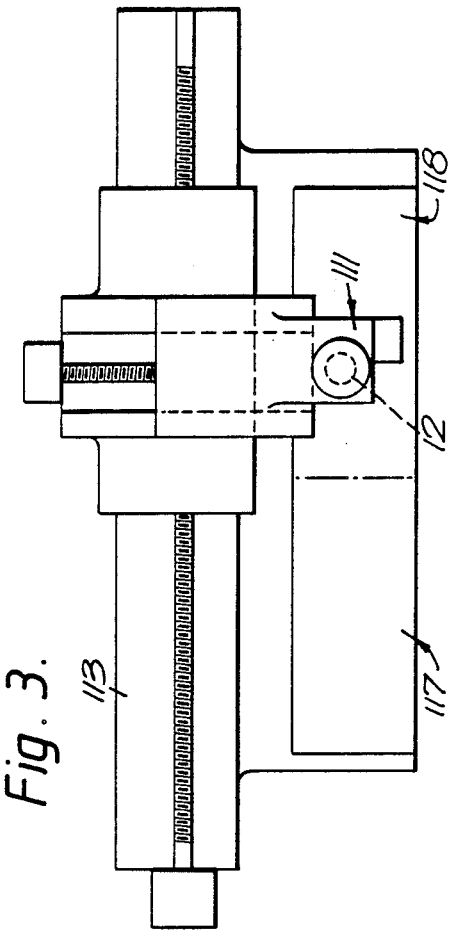
FIG. 3 is a view similar to FIG. 2 but showing a second embodiment.

In the embodiment shown in FIG. 3, a magazine 117 and a machining support 118 are stationary, and a headstock 111 is movable on a track 113 along the magazine 117 and support 118 for the purpose of transferring workpieces therebetween. The magazine 117 can be arranged to include a tray or palette containing the workpieces and being removable from a supporting surface of the magazine. Also the support 118 can be to some extent movable relative to the magazine for the purpose of machining operations. However essentially, i.e. for the purpose of the transfer operation, the magazine and the support 118 are stationary.

I claim:

1. A machine tool comprising:
   a headstock;
   a spindle supported on said headstock;
   a first workholder supported on said headstock distinct from said spindle;
   a machining support;
   a second workholder supported on said machining support;
   means for relatively moving said spindle and said machining support for machining a workpiece held by the second workholder by a tool provided on said spindle;
   a magazine for releasably supporting a plurality of workpieces and situated in a position remote from said machining support;
   means for relatively moving said headstock and said magazine between positions in which said first workholder is situated respectively adjacent said second workholder and adjacent said magazine;
   first releasable gripper means provided on said first workholder, and said first workholder, when situated adjacent said magazine, being positioned relative to said magazine so that a workpiece can be gripped at one end of such workpiece by said first gripper means; and
   second releasable gripper means provided on said second workholder, and said second workholder, when situated adjacent said first workholder, being positioned relative thereto so that a workpiece can be gripped at its one end by said first workholder and at its other end by said second workholder;
   wherein a workpiece is transferable by means of said first workholder between said magazine and said second workholder independently of said spindle.

2. A machine tool according to claim 1 which further comprises a third releasable gripper means provided on said spindle; and a tool mount supported at said machining support; and wherein, in operation, a workpiece as held by said third releasable gripper means is machinable by rotation of said spindle relative to a tool secured to said tool mount.

* * * * *